(12) United States Patent
Waldhart et al.

(10) Patent No.: US 11,767,799 B2
(45) Date of Patent: Sep. 26, 2023

(54) SYSTEM FOR PREDICTING AT LEAST ONE CHARACTERISTIC PARAMETER OF A FUEL

(71) Applicant: INNIO Jenbacher GmbH & Co OG, Jenbach (AT)

(72) Inventors: Michael Waldhart, Telfs (AT); Oliver Baptista, Innsbruck (AT); Herbert Kopecek, Schwaz (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/781,371

(22) PCT Filed: Dec. 23, 2019

(86) PCT No.: PCT/AT2019/060447
§ 371 (c)(1),
(2) Date: May 31, 2022

(87) PCT Pub. No.: WO2021/127713
PCT Pub. Date: Jul. 1, 2021

(65) Prior Publication Data
US 2022/0412275 A1    Dec. 29, 2022

(51) Int. Cl.
*F02D 19/06* (2006.01)
*F02D 25/00* (2006.01)
*F02D 41/24* (2006.01)

(52) U.S. Cl.
CPC ..... *F02D 19/0697* (2013.01); *F02D 19/0628* (2013.01); *F02D 19/0634* (2013.01);
(Continued)

(58) Field of Classification Search
CPC .. F02D 19/0636; F02D 19/0697; F02D 25/22; G01N 33/0006
See application file for complete search history.

(56) References Cited

U.S. PATENT DOCUMENTS

| 7,210,455 B2 | 5/2007 | Visser et al. |
| 8,924,033 B2 | 12/2014 | Goutard et al. |

(Continued)

FOREIGN PATENT DOCUMENTS

| DE | 3410714 A1 | 3/1985 |

OTHER PUBLICATIONS

PCT Search Report and Written Opinion for Application No. PCT/AT2019/060447 dated Sep. 17, 2020.

*Primary Examiner* — John Kwon
(74) *Attorney, Agent, or Firm* — Fletcher Yoder, P.C.

(57) ABSTRACT

A system comprising
a distribution grid (2) for a fuel,
combustion engines (3), which are coupled with the distribution grid (2) and are configured to combust the fuel, and
a computer system (4) comprising data connections (5) to the combustion engines (3) and a data storage device (6), wherein the computer system (4) is configured to receive engine operation parameters stemming from an operation of the combustion engines (3) at a first time and/or during a first time period via the data connections (5) and geographical data of the combustion engines (3) are stored in the data storage device (6), wherein
the computer system (4) has a processor (7) which is configured to compute a prediction for at least one characteristic parameter of the fuel at a second time and/or during a second time period later than the first time and/or the first time period and with respect to a geographical location, and
the computation of the prediction being based on the geographical data and the engine operation parameters of the combustion engines (3).

20 Claims, 6 Drawing Sheets

(52) U.S. Cl.
CPC ......... *F02D 25/00* (2013.01); *F02D 41/2438* (2013.01); *F02D 19/0644* (2013.01); *F02D 2200/0602* (2013.01); *F02D 2200/0606* (2013.01); *F02D 2200/0611* (2013.01); *F02D 2200/10* (2013.01)

(56) References Cited

U.S. PATENT DOCUMENTS

| | | |
|---|---|---|
| 10,006,398 B2 | 6/2018 | Atterberry et al. |
| 10,393,712 B2 | 8/2019 | Li |
| 2017/0218837 A1 | 8/2017 | Zhong et al. |
| 2023/0080545 A1* | 3/2023 | Cella .................. G06F 16/2462 700/118 |
| 2023/0109096 A1* | 4/2023 | Cella ..................... B29C 64/379 702/184 |
| 2023/0137578 A1* | 5/2023 | Cella ................. G06Q 30/0206 705/28 |

* cited by examiner

Fig. 2a
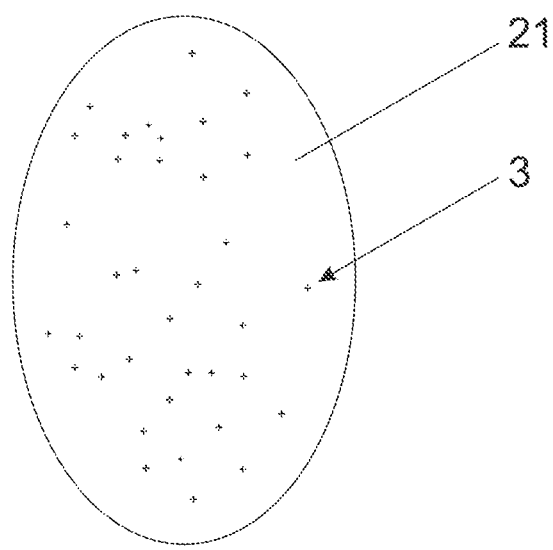
Fig. 2b
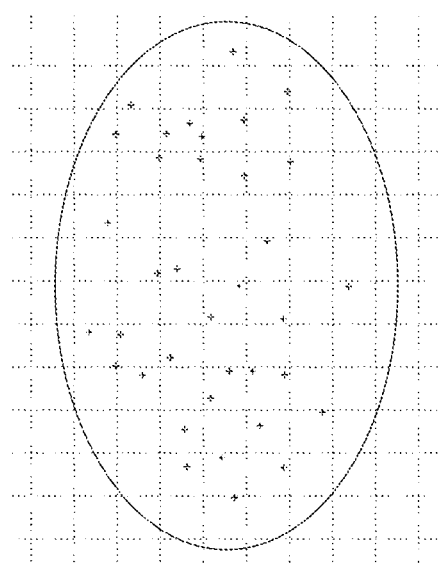
Fig. 2c

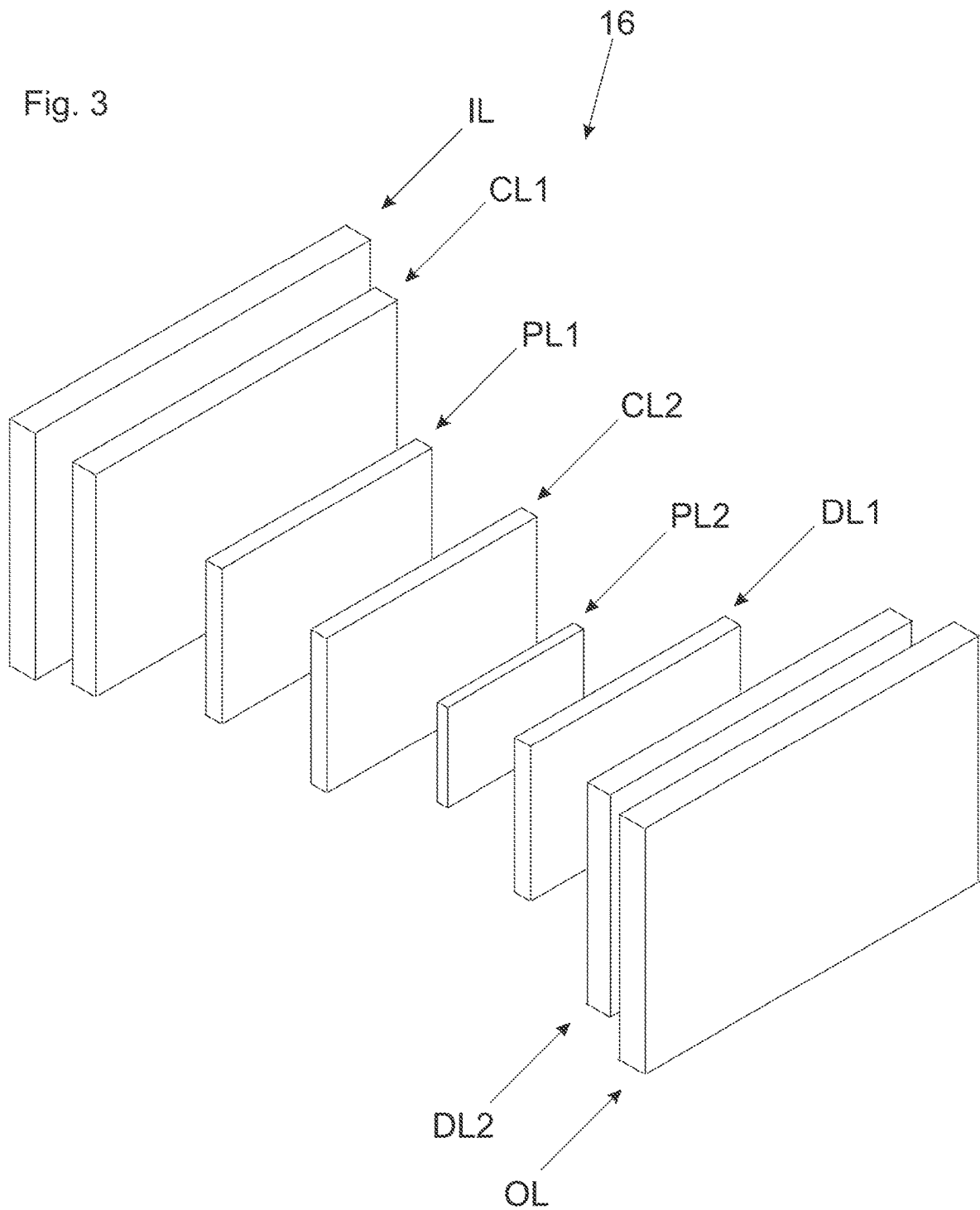

Fig. 6

$$F_k^{(j)} \oplus h_k^{(j-1)} = \begin{pmatrix} \beta_{11}^{(j)} & \beta_{12}^{(j)} \\ \beta_{21}^{(j)} & \beta_{22}^{(j)} \end{pmatrix} \oplus \begin{pmatrix} h_1^{(j-1)} & h_2^{(j-1)} \\ h_3^{(j-1)} & h_4^{(j-1)} \end{pmatrix}$$

$$= h_1^{(j-1)} \begin{pmatrix} \beta_{11}^{(j)} & \beta_{12}^{(j)} & 0 \\ \beta_{21}^{(j)} & \beta_{22}^{(j)} & 0 \\ 0 & 0 & 0 \end{pmatrix} + h_2^{(j-1)} \begin{pmatrix} 0 & \beta_{11}^{(j)} & \beta_{12}^{(j)} \\ 0 & \beta_{21}^{(j)} & \beta_{22}^{(j)} \\ 0 & 0 & 0 \end{pmatrix} + h_3^{(j-1)} \begin{pmatrix} 0 & 0 & 0 \\ \beta_{11}^{(j)} & \beta_{12}^{(j)} & 0 \\ \beta_{21}^{(j)} & \beta_{22}^{(j)} & 0 \end{pmatrix} + h_4^{(j-1)} \begin{pmatrix} 0 & 0 & 0 \\ 0 & \beta_{11}^{(j)} & \beta_{12}^{(j)} \\ 0 & \beta_{21}^{(j)} & \beta_{22}^{(j)} \end{pmatrix}$$

$$= \begin{pmatrix} h_1^{(j-1)}\beta_{11}^{(j)} & h_1^{(j-1)}\beta_{12}^{(j)} + h_2^{(j-1)}\beta_{11}^{(j)} & h_2^{(j-1)}\beta_{12}^{(j)} \\ h_1^{(j-1)}\beta_{21}^{(j)} + h_3^{(j-1)}\beta_{11}^{(j)} & h_1^{(j-1)}\beta_{22}^{(j)} + h_2^{(j-1)}\beta_{21}^{(j)} + h_3^{(j-1)}\beta_{12}^{(j)} + h_4^{(j-1)}\beta_{11}^{(j)} & h_2^{(j-1)}\beta_{22}^{(j)} + h_4^{(j-1)}\beta_{12}^{(j)} \\ h_3^{(j-1)}\beta_{21}^{(j)} & h_3^{(j-1)}\beta_{22}^{(j)} + h_4^{(j-1)}\beta_{21}^{(j)} & h_4^{(j-1)}\beta_{22}^{(j)} \end{pmatrix}$$

SYSTEM FOR PREDICTING AT LEAST ONE CHARACTERISTIC PARAMETER OF A FUEL

CROSS-REFERENCE TO RELATED APPLICATION

This application is a National Stage entry from, and claims benefit of, PCT Application No. PCT/AT2019/060447, filed on Dec. 23, 2019; entitled "SYSTEM FOR PREDICTING AT LEAST ONE CHARACTERISTIC PARAMETER OF A FUEL", which is herein incorporated by reference in its entirety.

BACKGROUND

The present invention concerns a system with the classifying portion as described and claimed below, a computer system for predicting at least one characteristic parameter of a fuel supplied by a distribution grid, a method for predicting at least one characteristic parameter of a fuel supplied using a distribution grid, a data signal, a computer program product for predicting at least one characteristic parameter of a fuel supplied by a distribution grid, and a method for training of a computer program product.

Distribution grids for fuels are used to provide fuel for many different types of machines, including gas engines.

These distribution grids for fuels (in particular gaseous fuels) are supplied with a variety of chemically different fuels, because there are different types for fuels which are produced and provided in different ways. Examples would be natural gas, biogas, or molecular hydrogen from electrolysis. Even natural gas itself displays a remarkable diversity in its composition and can therefore have very different combustion properties.

It is therefore evident that in many instances it is desirable to know exactly what fuel is coming out of a certain access port and what its properties are. Just as an example, the control of a gas engine can and should be adapted for the properties of the combusted gas to maximize efficiency and/or power output.

In principle, it would be possible to chemically analyse the fuel at the geographical location of interest, which however requires a lot of effort and costly analysing equipment, because large quantities of fuel have to be analysed in short periods of time.

Independently of the use of combustion engines, other suggested techniques propose to simulate the propagation of the gas inside the distribution grid ("Gas Quality Tracking Supports Integration of Renewable Gases in the Gas Network", Schley, Hielscher, Rickelt, $27^{th}$ World Gas Conference, 2018). However, this requires quite accurate knowledge of the layout (including distances and branch points) of the grid. Such information about the grid is in most cases only known to the operator of the grid.

BRIEF DESCRIPTION

The object of the invention is therefore to provide a system, a computer system, a method, and a computer program product which allow for an easier determination of the properties of the fuel coming from a distribution grid compared to the state of the art.

Accordingly, one aspect of the invention concerns a system comprising:
  a distribution grid for fuel,
  combustion engines, which are coupled with the distribution grid and are configured to combust the fuel, and
  a computer system comprising data connections to the combustion engines and a data storage device, wherein the computer system is configured to receive engine operation parameters stemming from an operation of the combustion engines at a first time and/or during a first time period via the data connections and geographical data of the combustion engines are stored in the data storage device.

Regarding the system, this object is achieved with the features of:
  the computer system has a processor which is configured to compute a prediction for at least one characteristic parameter of the fuel at a second time and/or during a second time period later than the first time and/or the first time period and with respect to a geographical location, and
  the computation of the prediction being based on the geographical data and the engine operation parameters of the combustion engines.

Regarding the computer system, the object is achieved with the features of:
  a signal input device configured to receive engine operation parameters stemming from an operation of the combustion engines at a first time and/or during a first time period,
  a data storage device, in which geographical data of the combustion engines are stored, and
  a processor configured to compute a prediction for the at least one characteristic parameter of the fuel at a second time and/or during a second time period later than the first time and/or the first time period and with respect to a geographical location, the prediction being based on the operation parameters and the geographical data of the combustion engines.

Regarding the method, the object is achieved with the features of:
  combustion engines are operated at a first time and/or during a first time period, wherein fuel for the combustion engines is provided by the distribution grid,
  engine operation parameters of combustion engines stemming from the operation and geographical data of the combustion engines are provided, and
  based on the engine operation parameters and the geographical data a prediction for the at least one characteristic parameter at a second time and/or during a second time period later than the first time and/or the first time period and with respect to a geographical location of the fuel is computed.

Together with the method as set forth above, also the product directly obtained with this method is protected, which is in this case a data signal.

Regarding the computer program product, the object is achieved with instructions which cause a computer executing the computer program product to
  receive operation parameters of a combustion engine stemming from an operation of the combustion engines (3) with a fuel from a distribution grid at a first time and/or during a first time period,
  access a data storage device in order to obtain geographical data of the combustion engines, and
  compute a prediction for the at least one characteristic parameter of the fuel at a second time and/or during a second time period later than the first time and/or the first time period and with respect to a geographical location, the prediction being based on the operation parameters and the geographical data of the combustion engines.

Protected is also a method, wherein training data is provided, and based on the training data a learned parameter set for the computer program product is provided such, that the computer program product computes a prediction for at least one characteristic parameter of a fuel from a distribution grid when the computer program product is executed using the training parameter set, the prediction being computed
- with respect to a second time and/or during a second time period later than a first time and/or a first time period,
- with respect to a geographical location, and
- based on operation parameters of combustion engines and geographical data of the combustion engines, wherein the operation parameters of the combustion engines stem from an operation of the combustion engines with the fuel from the distribution grid at the first time and/or during the first time period.

A basic aspect of the invention is that a plurality of combustion engines at different geographical locations (which may include combustion engines which are 1 and/or 10 and/or 100 and/or 1000 kilometres apart from each other) can be used as indicator of various properties of the fuel. While a single combustion engine might not provide enough accurate information, by accruing operation parameters from a plurality of combustion engines and correlating (in a very general sense) this information with the geographical locations of these combustion engines conclusions about the properties of the fuel at the second time and/or during the second time period and at a (different) geographical location can be drawn with enough precision and/or certainty.

The prediction according to the invention can be obtained without knowledge of the layout of the distribution grid.

As an example, the plurality of combustion engines can comprise at least 10, 100 or 1000 combustion engines.

As an example, the second time and/or the second time period can be 10 minutes and/or more than 10 minutes and/or 30 minutes and/or more than 30 minutes and/or an hour and/or more than one hour later than the first time and/or the first time period.

As an example, a length of the first and/or second time period can be chosen to be 10 seconds and/or more than 10 seconds and/or 1 minute and/or more than 1 minute and/or 10 minutes and/or more than 10 minutes and/or an hour and/or more than one hour.

The data connections between the computer system and the combustion engines are used according to the invention to transmit engine operation parameters to the computer system.

It is possible to convert the engine operation parameters to other quantities before transmitting them to the (central) computer system. Examples of such quantities would be estimations of the at least one characteristic parameter of the fuel or estimations of changes of the at least one characteristic parameter. Such quantities are also to be understood as engine operation parameters in the context of the invention.

Of course, the data connections can also be used to transmit data from the computer system to the combustion engines. For example, if the prediction results indicate that other settings for the combustion engine, e.g., in the form of command values for the operation parameters, would result in better engine performance, e.g., a better efficiency or a higher power output.

The operation parameters can be measured values at the combustion engines or for example a generator for generating electrical energy which is driven by one of the combustion engines. The operation parameters can also be command values used for controlling the combustion engines.

The prediction of the at least one characteristic parameter of the fuel will in many cases not be exactly accurate, simply because the operation parameters of the combustion engines may be subject to inaccuracies from a measuring process and the computation of the prediction cannot be accurate to an indefinite degree. The invention, however, achieves an acceptable, in some embodiments excellent, accuracy without the strict necessity for additional equipment for chemically analysing the fuel at the desired geographical location.

Furthermore, the geographical data can be used to determine a spatial and/or time distribution of the properties of the fuel.

While it is not strictly necessary, the prediction according to the invention can also be based on results of chemically analysing the fuel at certain points (e.g., at the first time and/or during the first time period), in particular at locations where the fuel is added. For example, if the operation parameters of the gas engines are not suitable to provide estimations of absolute values for the at least one characteristic parameter of the fuel, but only allow for detection of changes in the at least one characteristic parameter, the absolute prediction at the desired geographical location can be achieved by starting from the absolute values from the chemical analyses and infer the prediction by making use of the changes detected at the combustion engines. Formulated differently, the prediction according to the invention can be gauged using measurement values from the (more accurate) chemical analyses.

The prediction of the at least one characteristic parameter of the fuel according to the invention results in time-specific (namely at the second time or during the second time period) and location specific (namely with respect to the desired geographical location) predicted values. In other words, the prediction according to the invention can yield predicted values for the properties of the fuel at a specific location where the fuel can be taken from the distribution grid.

In the context of the invention geographical information (i.e., the geographical data and the geographical location according to the claims) can include the location of the combustion engines or the location where the fuel is taken from the distribution grid in order to supply the combustion engines. These locations can be stored/collected as absolute, global locations or relative locations.

If locations are distributed with distances for which the approximately spherical shape of the earth becomes noticeable it might be advisable to use a projection of these locations onto a Euclidian plane (any known projection technique can be used).

This geographical information does not have to be completely accurate. For example, in one preferred embodiment the geographical data of the combustion engine can be in the form of grid tiles (e.g., of a rectangular grid or a hexagonal grid) in which a number of combustion engines are situated. The operation parameters of the engines in a specific grid tile are then collected and count as the same location for the computation of the prediction according to the invention.

The grid tiles can have characteristic sizes (i.e., edge length of a rectangular grid) between 300 km and 10 km, preferably between 200 km and 10 km and more preferably between 100 km and 10 km.

The geographical information can also include locations of where fuel is added to the distribution grid, for example the locations of biogas plants or terminal points of pipelines.

The geographical location for which the prediction is provided according to the invention can be the locations of ports for taking fuel from the distribution grid and/or can be the locations of the combustion engines or further combustion engines. It may also possible to predict the quality of the fuel at locations in consideration for deploying a new combustion engine. In this way the best possible location for a new combustion engine can be determined.

The prediction with respect to the geographical location can be a prediction for a certain geographical point or some geographical area. Preferably the size of the area can correspond to an accuracy of the available geographical data or correspond (roughly) to the size of grid tiles used in the grid overlay.

The expression "later" in connection with time periods can be understood such that the starting time of the later time period is after the starting time of the earlier time period. Preferably, also the end time of the earlier time period is before the starting time of the later time period.

It is noted, that the first time or the first time period and/or the second time or time period can comprise more than one time or time periods each. If this is the case, it is then to be understood that the latest of the first times is before the earliest of the second time and analogously for time periods.

The processor of the system according to the invention can be used to execute the computer program product according to the invention.

The processor can be realised as one single computing unit or as a plurality of separate computing units which may be situated in proximity and/or distantly from each other (distributed computing).

The data storage device can be of transitory and/or non-transitory nature.

The geographical data can therefore be stored in a non-transitory way and/or it can be received—e.g., along with the operation parameters—and stored in a transitory data storage device, such as for example RAM or a cache of the processor.

The computer system set forth in the claims can be the computer system discussed with respect to the system and/or the method and/or the computer program product.

The prediction according to the invention can be output in the form of a data signal containing the prediction. The data signal can then be received, e.g., by a monitor to be viewed by an operator and/or a control unit of a further combustion engine (see below).

The fuel can preferably be gaseous fuel (i.e., the distribution grid is preferably a distribution grid for gaseous fuel). That means that the gaseous fuel is a fuel which is in a gaseous phase when supplied to the combustion engines.

Within the distribution grid the fuel is usually in a gaseous phase.

The fuel can for example be natural gas (e.g., with methane as main component), biogas, and/or molecular hydrogen.

The term "combustion engines" refers to the entirety of the engines. The term "combustion engine" is used to refer to a—depending on the context arbitrary or specific—combustion engine of the entirety of the combustion engines.

The geographical data of the combustion engines may or may not include topographical information about the distribution grid.

Further advantageous embodiments of the invention are defined in the dependent claims.

The prediction being based on the engine operation parameters can be based on changes of the engine operation parameters at the first time or during the first time period.

The changes of operation parameters are also considered to be operation parameters of the combustion engines in the context of the invention.

Measures conceived for the system according to the invention can of course also be taken for the computer system, the method, and/or the computer program product according to the invention.

The at least one characteristic parameter of the fuel can comprise a parameter indicative of the combustion energy of the fuel, in particular a gross calorific value of the fuel, and/or a parameter indicative of a tendency for uncontrolled combustion of the fuel, in particular a methane number. In a particularly preferred embodiment both the caloric value and the methane number of the fuel can be predicted according to the invention.

The methane number in and of itself is known in the state of the art and describes the tendency for uncontrolled combustion of a fuel. For reciprocating piston engines the methane number is also said to describe the tendency to cause "knock", i.e., large amounts of mechanical vibration caused by uncontrolled combustion.

The caloric value in and of itself is also known in the state of the art.

At least one further combustion engine which is coupled to the distribution grid and configured to combust the fuel can be present. Then the prediction based on the geographical data and the operation parameters of the (other) combustion engines can be used to predict the properties of the fuel at the location of the at least one further combustion engine or at the location where the fuel for supplying the further combustion engine is taken from the distribution grid.

In a particularly preferred embodiment, the set points for a closed and/or open loop control of the at least one further combustion engine and/or a time of operation of the further combustion engine can then be determined based on the prediction of the at least one characteristic parameter of the fuel at a geographical location of the at least one further combustion engine. By providing multiple predictions according to the invention the set points for the control of the combustion engines can be adapted/optimized for different (second) times or time periods.

For example, when the combustion engine is not intended to run at all times, the prediction according to the invention may be used to determine what time of operation is most advantageous.

In a simple example where a different type of fuel is added at a certain entry point on the distribution grid with an otherwise uniform fuel using the invention the distribution process of the different type of fuel can be predicted and monitored and the control of the at least one further combustion engine can be adequately changed when the different type of fuel is expected to arrive at the location of the at least one further combustion engine.

The role of the at least one further combustion engine can be changed dynamically. Expressed differently, among an ensemble of combustion engines the combustion engine for which the prediction is made can be chosen as needed (this particular combustion engine thereby taking the role of the at least one further combustion engine).

The engine operation parameters can comprise at least one of the following: mechanical power output of the combustion engine and/or a load of the combustion engine, thermal output of the combustion engine and/or a load of the combustion engine, electric power output of a genset comprising the combustion engine and a generator driven by the combustion engine, charge pressure, charge temperature, efficiency of a genset comprising the combustion engine and a generator driven by the combustion engine, volume of the fuel, pressure of the fuel, temperature of the fuel, ignition timing point, wastegate position, throttle valve position, compressor bypass valve, variable valve timing parameters, variable turbo charger geometry position, emission parameters of the combustion engine and/or changes over time of these quantities.

As already mentioned, it is also possible to derive estimations of the at least one characteristic parameter of the fuel and transmit these estimations to the computer system, instead of a potentially quite large data set. The same can, of course, also be done for estimations of changes of the at least one characteristic parameter of the fuel.

The processor or the computer program product can, of course, also be configured to convert the engine operation parameters to estimations of the at least one characteristic parameter of the fuel and/or to estimations of changes of the at least one characteristic parameter of the fuel.

An example for estimating the at least one characteristic parameter of the fuel from data available at a combustion engine is given in the concrete embodiment described together with the figures below.

In preferred embodiments, it can be provided that
the engine operation parameters and/or the estimations of the at least one characteristic parameter of the fuel and/or the estimations of the changes of the at least one characteristic parameter of the fuel on the one hand and the geographical data of the combustion engines on the other hand are provided in the form of a data grid, wherein positions of entries within the data grid represent the geographical data and values of the entries represent the engine operation parameters and/or the estimations of the at least one characteristic parameter and/or the estimations of changes of the at least one characteristic parameter,
and the data grid is preferably provided for and/or as an input layer of a neural network.

The positions of the entries within the data grid can therefore encode the geographical data of the combustion engines. This can happen in a manner obvious or non-obvious to a human. For example, a 2-dimensional data grid can be used where the positions in the 2-dimensional grid roughly correspond to the geographical location. For example the entries of the two-dimensional grid can correspond to grid tiles superposed onto available geographical data, e.g., in the form of a map.

An example where the positions of the grid are not necessarily obvious to a human would be a 1-dimensional grid (i.e., a vector), e.g., as vectorised form of the aforementioned 2-dimensional grid.

Data grids can be viewed as matrices, or vectors, or—in general—tensors.

The engine operation parameters and/or the estimations of the at least one characteristic parameter and/or the estimations of changes of the at least one characteristic parameter and/or data from chemical analysis of the fuel can be provided in two or more channels of the data grid. Additional channels in the grid can be realised as additional dimensions in the data grid.

The prediction may be calculated (i.e., the processor may be configured to calculate the prediction) using a machine learning model, in particular at least one neural network, preferably comprising a convolutional neural network and/or a recurrent neural network. Some general information regarding the mentioned types of neural networks is provided below.

The at least one neural network can be stored in the data storage device of the computer system according to the invention or in a separate data storage device. The computer program product can then access the at least one neural network during execution of the computer program product.

The at least one neural network can preferably comprise a plurality of layers (so-called deep neural networks).

The data grid can be provided for and/or as the input layer of the convolutional neural network, i.e., the processor can be configured to receive and/or represent the data grid as the input layer of the convolutional neural network.

The convolutional neural network can contain at least one first layer comprising convolution operations with filters of smaller size than the data grid, where a number of channels of the filters preferably equals a number of the channels of the data grid.

The output of the at least one first layer can be used as input for the at least one second layer. Of, course it is possible to have further computing steps and/or further intermediate layers between the at least one first layer and the at least one second layer.

Such further computing steps can also be present between the at least one first layers and/or the at least one second layers, if a plurality of at least one first layers and/or at least one second layers are present.

The at least one neural network can contain at least one second layer comprising deconvolution operations and weights for the at least one second layer, which weights are learned during training of the neural net such that an output of the at least one neural network is the prediction of the at least one characteristic parameter of the fuel at the second time or during the second time period and with respect to the geographical location.

A neural network containing at least one first layer as part of a convolutional neural network and at least one second layer with deconvolution operations is known in the prior art as convolutional auto-encoder. Known auto-encoders are trained to roughly reproduce the data (usually images) in order to find out to which features of the input the network reacts strongly.

The additional characteristic that weights of the at least one second layer are learned during training of the neural net such that an output of the at least one neural network is the prediction of the at least one characteristic parameter of the fuel at the second time or during the second time period and with respect to the geographical location has a particular significance.

As already mentioned, auto-encoders of the prior art are trained to roughly reproduce the input. According to the mentioned aspect of the invention the weights are learned such that the output is the prediction at the later second time (or during the second time period). That is, the deconvolutions are used to reproduce the time development of the at least one characteristic parameter of the fuel. This new approach for using deconvolution operations in a neural network results in a particularly easy and elegant way to generate the desired (accurate) predictions.

The at least one neural network can contain at least one third layer realising an LSTM network with weights, which are learned during training of the neural network such that an output of the at least one neural network is the prediction of the at least one characteristic parameter of the fuel at the second time or during the second time period and with respect to the geographical location.

LSTM neural networks are a certain kind of recurrent neural networks, which are adapted to analyse string-like input such as language or time-series. In this aspect of the invention, recurrent neural networks, in particular LSTM networks, are used to analyse data that contain spatial information, i.e., the geographic data. That is, recurrent networks are exploited in a new way in order to generate predictions of geographical (i.e., 2-dimensional) data—as opposed to creating predictions of the next item in a string—which is also a particularly easy and elegant way to generate the desired (accurate) predictions.

It is mentioned that in particularly preferred embodiments the involved at least one neural network and in particular the at least one first layer and/or the at least one second layer and/or the at least one third layer are so-called deep neural networks with two, three or more layers each.

The convolution and deconvolution operations are to be understood broadly in the context of the invention. For example cross-correlations are also included in the term "convolution". Convolutions are therefore broadly linear operations which measure the overlap of parts of the input data with the corresponding filter. Deconvolutions broadly are linear operations with which output data can be constructed with contributions from a filter where the size of the contribution at specific locations is given by the input data.

One aspect of the invention in embodiments with a neural network is that the neural network has a first part (e.g., the at least one first layer) and a second part (e.g., the at least one second layer), where the first part is adapted to analyse the spatial distribution of the fuel and the second part is adapted to predict the evolution over time of the distribution of the fuel.

Linear Regression

In a very basic embodiment of the invention the at least one characteristic parameter of the fuel can be determined at the locations of the combustion engines and the spreading of the fuel in the distribution grid can be modelled with a constant velocity from geographical location to geographical location (i.e., linear regression).

More concretely, assuming there are two injection points or points where the at least one characteristic parameter of the fuel is estimated called A and B with DAB the geographical distance between A and B (the geographical data in relative form), the prediction according to the invention can be calculated as follows:

Calculate the effect of injection point A on point B and vice versa as Q ("gas Quality") being used as the at least one characteristic parameter of the fuel:

$$Q_{B(t+1)} = \beta_{1A} + \beta_{2A} D_{AB(t)} + \beta_{3A} Q_{A(t)}$$

and $$Q_{A(t+1)} = \beta_{1B} + \beta_{2B} D_{AB(t)} + \beta_{3B} Q_{B(t)}.$$

Making use of a number n (greater than 3 in this example) of time synchronous observations for $Q_A$ and $Q_B$ and the distance $D_{AB}$ can be used to calculate the parameters $\beta_{1A}$, $\beta_{2A}$, $\beta_{3A}$, $\beta_{1B}$, $\beta_{2B}$, $\beta_{3B}$.

For an unknown point X, located at $D_{AX}$ geographical distance from A and at $D_{BX}$ geographical distance from B, the virtual distance from point B is $\beta_{2B} D_{BX}$ and the virtual distance from point A is $\beta_{2A} D_{AX}$. Using the values for the parameters $\beta_{1A}$, $\beta_{2A}$, $\beta_{3A}$, $\beta_{1B}$, $\beta_{2B}$, $\beta_{3B}$ the effect (i.e., the prediction of the at least one characteristic parameter of the fuel) of injection point A on X and of point B on X can be calculated with the equations $$Q_{XA\_CALCULATED(t+1)} = \beta_{1A} + \beta_{2A} D_{AX(t)} + \beta_{3A} Q_{A(t)}$$

and $$Q_{XB\_CALCULATED(t+1)} = \beta_{1B} + \beta_{2B} DB_{X(t)} + \beta_{3B} Q_{B(t)}.$$

This scheme can of course be generalized for a number of k unique injection points. The prediction for the at least one characteristic parameter of the fuel with Q X at the point X at time t+1 (time step=1) is then $$QX(t+1) = \frac{1}{k} \sum_{i=1}^{k} QXi\_CALCULATED(t+1)$$

with $$\sum_{i=1}^{k} QXi\_CALCULATED(t+1) = \beta_{1i} + \beta_{2i} D_{AX(t)} + \beta_{3i} Q_{i(t)}.$$

It can be seen here, that this can result in a large number of linear equations if there are a many points A, B, C, . . . (indexed by i in the two equations above) which have to be taken into account. For such a large number of points this scheme can therefore become computationally quite expensive, to the point even where calculating the prediction in this way is not viable anymore.

If this is the case, the embodiments making use of machine learning mentioned before can be used (of course, these can also be used if linear regression were still computationally feasible).

Some general information relevant to the invention about convolutional networks, deconvolution operations and LSTM networks as well as some additional information relevant to the invention about the concretely envisioned embodiments using machine learning is collected in the following.

Convolutional Neural Networks

General references for neural networks are for example:
B1: *"Neural Networks and Deep Learning"*, Aggarwal, Springer, 2018
B2: *"Deep Learning"*, Goodfellow, Benigo, Courville, mitp, 2018

Convolutional Neural Networks are conventionally used in image recognition applications, where the neural net is used to extract features of the image using filters. The engine operation parameters and/or the estimations of the at least one characteristic parameter of the fuel and/or the estimations of the changes of the at least one characteristic parameter of the fuel together with the geographical data of the combustion engines may also be interpreted as an image (like a map) of the fuel distribution at the first time or the first time period.

A Convolutional Neural Network can be used to extract features of this "map" in a computationally viable way. These features can then be the basis for "evolving" the map in additional layers (i.e., the at least one second layer and/or the at least one third layer) or with other techniques.

The basic linear operation performed in the convolutional layers of a neural network can in general terms be written as (B1, page 318 ff; B2, page 370 ff)

$$S(i,j) = (I*K)(i,j) = \sum_m \sum_n I(i\pm m, j\pm n) F(m,n).$$

Here I denotes an input data grid (e.g., a matrix), F denotes some filter (see below) and S is the output of the operation. Accordingly, the Filter is superposed with the input, the entries are multiplied and the results are summed up. The order and manner of the superposition as well as the choice of plus or minus are a matter of convention. Using the minus option is generally called convolution and the plus option is generally called cross correlation. However, also different conventions exist and the term "convolution" is also used generally for these types of operation. Unless otherwise specified the term "convolution" is used in the more general sense for the purposes of this document.

The general idea is that the operation captures to what extent the feature encoded by the filter is present in the input.

The input can for example be the input layer of the at least one neural network or the output of a previous layer of the network.

It is noteworthy that the convolution generally decreases the size of the input, i.e., the output will generally have fewer entries than the input. To counteract this tendency padding can be used.

Of course, in any convolutional layer of a neural network typically more than one filter is used.

The general form of a filter can be given in the form of a matrix, e.g.

$$F_k^{(1)} = \begin{pmatrix} \beta_{11}^{(1,k)} & \beta_{12}^{(1,k)} \\ \beta_{21}^{(1,k)} & \beta_{22}^{(1,k)} \end{pmatrix}.$$

This is an example of (one channel of) a filter with size 2×2. Other (larger and/or varying) filter sizes are commonly used alternatively or additionally in any convolutional layer.

$\beta_{ij}^{(1,k)}$ denote the parameters of the filter which are also called "weights" of the network. These are part of the parameter set which has to be learned as part of the training of the network (see below).

The parameter k of the filter denotes the channels of the filter. That is, for a filter with p channels there are p copies of the matrix given above. The actual (first) filter is then a tensor with p copies of the $F_k^{(1)}$ given above.

For the first (of the at least one first) layer the input of the convolution is the input layer, e.g., the data grid. Usually there will be more than one first layer, which will also be called "convolutional layers" here. This input is denoted as follows:

$$Q^k = \begin{pmatrix} Q_{11}^{(k)} & Q_{12}^{(k)} & Q_{13}^{(k)} \\ Q_{21}^{(k)} & Q_{22}^{(k)} & Q_{23}^{(k)} \\ Q_{31}^{(k)} & Q_{32}^{(k)} & Q_{33}^{(k)} \end{pmatrix}$$

As before, the $Q_{ij}^{(k)}$ denote for example estimations of the at least one characteristic parameter of the fuel. An example is given in connection with FIG. 2c below.

Again, the 3×3-size of the data grid is to be taken as a particular example chosen to be easily comprehensible. In a realistic neural network for implementing an embodiment of the invention the size will usually be much larger.

Again, the parameter k denotes the different channels the input might come in.

One single convolution of this data grid with the filter can be computed as given in the initial equation above. For concrete implementations the convolution operation is often implemented as matrix operation on a vectorised form of the input.

This is done by vectorising the input and converting the filters to sparse matrices in the following way (B1, page 335 ff; B2 page 372 ff):

$$F_k^{(1)} = \begin{pmatrix} \beta_{11}^{(1,k)} & \beta_{12}^{(1,k)} \\ \beta_{21}^{(1,k)} & \beta_{22}^{(1,k)} \end{pmatrix}$$

$$\rightarrow \tilde{F}_k^{(1)} = \begin{pmatrix} \beta_{11}^{(1,k)} & \beta_{12}^{(1,k)} & 0 & \beta_{21}^{(1,k)} & \beta_{22}^{(1,k)} & 0 & 0 & 0 & 0 \\ 0 & \beta_{11}^{(1,k)} & \beta_{12}^{(1,k)} & 0 & \beta_{21}^{(1,k)} & \beta_{22}^{(1,k)} & 0 & 0 & 0 \\ 0 & 0 & 0 & \beta_{11}^{(1,k)} & \beta_{12}^{(1,k)} & 0 & \beta_{21}^{(1,k)} & \beta_{22}^{(1,k)} & 0 \\ 0 & 0 & 0 & 0 & \beta_{11}^{(1,k)} & \beta_{12}^{(1,k)} & 0 & \beta_{21}^{(1,k)} & \beta_{22}^{(1,k)} \end{pmatrix}$$

and $$Q^k = \begin{pmatrix} Q_{11}^{(k)} & Q_{12}^{(k)} & Q_{13}^{(k)} \\ Q_{21}^{(k)} & Q_{22}^{(k)} & Q_{23}^{(k)} \\ Q_{31}^{(k)} & Q_{32}^{(k)} & Q_{33}^{(k)} \end{pmatrix} \rightarrow \vec{Q}^{(k)} = \begin{pmatrix} Q_{11}^{(k)} \\ Q_{12}^{(k)} \\ Q_{13}^{(k)} \\ Q_{21}^{(k)} \\ \vdots \end{pmatrix}$$

The complete convolution operation can then be written with these converted objects and a sum over all the channels as $$\vec{h}^{(1,1)} = F^{(1)} * Q = \Sigma_{k=1}^{P} \tilde{F}_{(k)}^{(1)} \cdot \vec{Q}^{(k)}.$$

The result of this first convolution operation is $\vec{h}^{(1,1)}$ in vector form. It would, of course, be possible to convert this vector output back to a matrix form, but in most cases the vectorised form is kept throughout the convolutional layers.

As is furthermore apparent, the numbers of channels p are the same for the filter and the input. However, using separate filters for separate channels is in principle conceivable.

Using more than one filter $\tilde{F}_{(k)}^{(i)}$ indexed by I the results of the convolution operations are then denoted as $$\vec{h}^{(1,i)} = F^{(i)} * Q = \sum_{k=1}^{P} \tilde{F}_{(k)}^{(i)} \cdot \vec{Q}^{(k)}$$

and the collection of $\vec{h}^{(1,i)}$ is the result of the complete first convolutional layer. These results are usually modified using a non-linear activation function for normalizing the output and/or emphasising results with higher output values (creating results of so called high "activation") while simultaneously deemphasising results with low output values.

As has already been mentioned, this (possibly modified) result of the first convolutional layer can be used as input for further convolutional layers. Alternatively, different operations like applying activation functions, pooling and/or padding (see below) can be performed before the results are input into the next convolutional layer.

The results of the additional convolutional layers (with number j) are then $$\vec{h}^{(j,i)} = \sum_{k_j=1}^{d_j} \tilde{F}_{(k_j)}^{(i)} \cdot f(\vec{h}^{(j-1,k_j)}) + b_{(k_j)}^{(i)}$$

where
  i runs through the filters used in the layer j,
  $k_j$ indexes the number $d_j$ filters in the j-th layer,
  $\vec{h}^{(j-1,k_j)}$ is the (possibly modified) output of the previous (convolutional) layer j−1, f collects the modification of $\vec{h}^{(j-1,k_j)}$ using an activation function, padding, and/or pooling and the like, and $b_{(k_j)}^{(i)}$ denotes a possible bias value for each filter (indexed by i) and each channel ($k_j$) (indexed by $k_j$).

It should be mentioned that convolutional neural networks according to the prior art usually include at least one so-called fully connected layer. In some preferred embodiments of the invention however, such fully connected layers are not present, since the use of the fully connected layers is to finalize the analysis of the input image (i.e., answering what is actually depicted in the image). These embodiments of the invention on the other hand make use of the convolutional layers to extract the features of the input data and then use additional layers (the at least one second layer) or other methods to predict the time evolution of the fuel.

However, there are also embodiments of the invention which do make use of fully connected layers. In these cases fully connected layers can be used to extract features of the map. Such features could be geographical regions or individual combustion engines for which the at least one characteristic parameter of the fuel lies within certain domains.

Such domains could be characterised by a particularly low and/or high value for the least one characteristic parameter of the fuel or there could be several domains which more granularly capture the values for the least one characteristic parameter of the fuel.

The prediction according to the invention can then be obtained by making use of convolutional neural networks with fully connected layers at different time steps and extrapolating the behaviour of the captured features.

In a simple example it could be checked if there is a difference (e.g., above a given threshold) in the features (captured with a convolutional neural network with fully connected layers) over time and an alarm could be triggered if such a difference occurs.

Embodiments of the invention can include pooling layers computationally before, in between and/or after convolutional layers. Such pooling methods (e.g., max-pooling or average-pooling) are used to reduce the size of the data and/or for removing unnecessary or unwanted data. Such pooling methods are in and of themselves known in the prior art (e.g., B1, page 326 ff).

Embodiments of the invention can include padding methods computationally before, in between and/or after convolutional layers. Such padding methods are used to prevent or decrease the effect of the convolutional operations of convolutional layers of reducing the size of the output. Such padding methods are in and of themselves known in the prior art (e.g., B1, page 322 ff). A prominent example would be zero-padding where zeros are added to the boundary of the results in matrix form (the zeros naturally also appear in between the entries in vectorised form).

As has already been mentioned, embodiments of the invention can also include the use of non-linear activation functions, which are also in and of themselves known in the prior art (e.g., B1 page 11 ff; B2 page 379 ff). Examples include signum functions, sigmoid functions, hyperbolic tangents, or ReLu. It should be noted that these activation functions can be chosen individually for each layer, filter, or even channel.

Deconvolution Operations

Deconvolution operations are operations for constructing output data from one or more filters where the input data defines the contribution of a filter at each position in the output. It is referred to FIG. 6 for an example. It bears mentioning that the deconvolution presented here is not necessarily the inverse map of the convolution.

It is also worth mentioning that—as the convolution—the deconvolution can be viewed as a matrix operation. For example, if the filter of the j-th deconvolutional layer is denoted as before by $$F_k^{(j)} = \begin{pmatrix} \beta_{11}^{(j)} & \beta_{12}^{(j)} \\ \beta_{21}^{(j)} & \beta_{22}^{(j)} \end{pmatrix}$$

and the output of the previous layer (index j−1) is denoted by $$\vec{h}^{(j-1)} = \begin{pmatrix} h_1^{(j-1)} \\ h_2^{(j-1)} \\ h_3^{(j-1)} \\ h_4^{(j-1)} \end{pmatrix}$$

then the matrix for implementing the deconvolution is the transposed of the sparse matrix presented in the previous sub-section (albeit with different index j), namely:

$$\tilde{F}^{(j)} = \begin{pmatrix} \beta_{11}^{(j)} & 0 & 0 & 0 \\ \beta_{12}^{(j)} & \beta_{11}^{(j)} & 0 & 0 \\ 0 & \beta_{12}^{(j)} & 0 & 0 \\ \beta_{21}^{(j)} & 0 & \beta_{11}^{(j)} & 0 \\ \beta_{22}^{(j)} & \beta_{21}^{(j)} & \beta_{12}^{(j)} & \beta_{11}^{(j)} \\ 0 & \beta_{22}^{(j)} & 0 & \beta_{12}^{(j)} \\ 0 & 0 & \beta_{21}^{(j)} & 0 \\ 0 & 0 & \beta_{22}^{(j)} & \beta_{21}^{(j)} \\ 0 & 0 & 0 & \beta_{22}^{(j)} \end{pmatrix}$$

The deconvolution is then $\tilde{F}^{(j)} \vec{h}^{(j-1)}$ (as matrix multiplication), and the result—reconverted to matrix form for easier readability—is the same as the expression given in FIG. 6:

$$\begin{pmatrix} h_1\ \beta_{11} & h_1\ \beta_{12}+h_2\ \beta_{11} & h_2\ \beta_{12} \\ h_1\ \beta_{21}+h_3\beta_{11} & h_1\ \beta_{22}+h_2\ \beta_{21}+h_3\ \beta_{12}+h_4\beta_{11} & h_2\ \beta_{22}+h_4\ \beta_{12} \\ h_3\ \beta_{21} & h_3\ \beta_{22}+h_4\ \beta_{21} & h_4\ \beta_{22} \end{pmatrix}$$

Here, the superscripts (j) and (j−1) have been omitted, to make the result more easily viewable.

The present example only has one channel. In general, i.e., with an arbitrary amount of channels, the matrix transpose is also taken across the filter dimensions. Details on the more general case and further information can be found in B1 page 358 ff and page 335 ff.

Recurrent Neural Networks and LSTM Cells

Unlike Convolutional Neural Networks, Recurrent Neural Networks are optimized for the analysis of string-like input, such as speech and time series.

In the context of LSTM networks (Long Short Term Memory Networks) envisioned here in a preferred aspect of the invention, the layers (i.e., the at least one second layer) are also called "LSTM-cells" or simply "cells". These cells may comprise at least one of the following:

a self-loop for updating the numerical state of each cell, also called cell state an input gate for emphasising certain aspects of the input a forget gate for limiting the effect of certain activations on the cell state an output gate for emphasising or deemphasising the output of a cell The cell state self-loop can be made to depend on the forget gate (so-called "peephole connections").

These elements of the LSTM-cells can each be furnished with weights to be learned in training the neural network.

The general setup of LSTM cells and LSTM networks can be found in "LSTM: A Search Space Odyssey", Greff, Srivastava, Koutnik Steunebrink, Schmidhuber, arxiv 1503.04069, Oct. 4, 2017. This article includes a detailed study on different embodiments and modifications of LSTM networks. For the purposes of the present document, such modifications of the LSTM network are also to be understood as LSTM networks.

Naturally, LSTM networks can contain more than one concatenated LSTM-cells.

The basic idea of the LSTM network is a management of "memory" of the network in the sense that activation from certain nodes at the beginning of the input can be selectively chosen to be highly influential for other nodes closer to the end of the input, i.e., the network "remembers" activation from an earlier part of the string-like input through the cell state self-loop.

In a similar manner an LSTM network can be made to forget certain activations through the forget gates.

Training of Neural Networks

The basic approach for training neural networks (e.g., back propagation) can be taken from the references given for the examples (B1 page 105 ff and page 332 ff; B2 page 90 ff and page 327 ff). The training requires training data, which includes training input data and preferably training output data. The prediction of the at least one neural network (starting with some arbitrary or specifically chosen weights) may then be compared with the training output data of the training set. This difference is called "loss function". One possible scheme for training neural networks is to change the weights in such a way that the loss function is minimized.

Preferably, the training data for the present invention can be taken from operation parameters of the combustion engines at previous times of operation together with the according geographical data.

In a particularly preferred embodiment, the time step of the prediction is chosen and the training data is chosen to include the engine operation parameters and/or estimations of the at least one characteristic parameter of the fuel and/or the estimations of the changes of the at least one characteristic parameter of the fuel from an operation at a first training times or during a first training time periods as training input data (denoted by $D_1$ in the example below) and/or the engine operation parameters and/or the estimations of the at least one characteristic parameter of the fuel and/or the estimations of the changes of the at least one characteristic parameter of the fuel from an operation at second training times or during a second training time periods as training output data (denoted by $D_2$ in the example below), where the second training times or the second training time periods is later (the chosen time step being the difference) than the corresponding first training times or the first training time periods.

$D_1$ and $D_2$ therefore may comprise a plurality (preferably of a large number) of copies of the data grid mentioned above.

The training data can be obtained through collecting and storing engine operation parameters over a (preferably long) period of time (i.e., through measurements and/or collecting and storing of set points and other parameters of the combustion engines) and/or simulations of the distribution grid (possibly with different layouts).

In one example for training the neural network is trained through a minimisation process. With this minimisation process a minimum of the deviation of the effect of the neural network on the training input data on the one hand and the training output data on the other hand are sought in order to provide a learned parameter set of the model. This minimum can be an approximate minimum and/or be local minimum (as opposed to a global minimum).

More concretely, with $D_1$ and $D_2$ as given above and U the collected effect of the neural network to be trained (e.g., as given in the embodiments above) on each of the copies of the data grid of $D_1$ this minimisation process minimises J given by:

$$J=\|D_2-U(D_1)\|^2$$

Here $\|X\|$ denotes some norm of X, e.g., the Frobenius Norm. For a simple example it can be referred to B1 page 72 ff.

There are different methods known in the prior art which can be used to obtain this minimisation. The references given contain examples and further ones can be found in B2 page 305 ff.

The result of the training of the at least one neural network is the learned parameter set which may include at least one of the following:

weights of filters for a convolutional neural network (the at least one first layer)

weights of filters for deconvolutional layers (the at least one second layer)

weights for the gates and states of LSTM cells (the at least one third layer)

bias parameters

In order to improve the training result, e.g., starting from a random distribution for the learned parameter set, cross-validation may be used (cf. B1 page 180).

A neural network trained in this way can—in inference mode of operation—reasonably be expected to yield the prediction for the second time or during the second time period if the input stems from the first time or the first time period and the difference between the second time or second time period and the first time or time period is equal to or approximates the chosen time step.

A re-training of the neural networks according to the invention can be performed at regular or irregular intervals. In this way incoming data from the combustion engines can be added to the training data. When one or more combustion engines are commissioned or decommissioned, this can be reflected in the geographical data, the operation parameters and the training data. When this happens a re-training of the neural networks according to the invention can be triggered.

An advantage of constructing the input data for the neural network via a grid overlay as mentioned before is that the neural network can become more robust regarding some of the combustion engines getting switched on or off because the engine operation parameters of other combustion engines in the same grid tile can be used.

Additionally or alternatively, it is possible to use the engine operation parameters for the time before an engine was switched off for the following hours.

The engine operation parameters and/or estimations of the at least one characteristic parameter of the fuel and/or the estimations of the changes of the at least one characteristic parameter of the fuel on which the prediction according to the invention is based may be subjected to a correction in order to reduce or eliminate effects that only appear locally. Examples for such local effects are certain types of wear or failures that reduce the effectivity of combustion engines or operators actively changing operation parameters.

Such correction of the engine operation parameters and/or estimations of the at least one characteristic parameter of the fuel and/or the estimations of the changes of the at least one characteristic parameter of the fuel can also be provided for the training data.

It should be mentioned that the terms "neural network" and "at least one neural network" are to be understood broadly. That is, the at least one first layer and/or the at least one second layer of the at least one neural network according to the invention are also understood as neural networks in and of themselves.

The plurality of combustion engines can comprise reciprocating engines, in particular gas engines.

Reciprocating engines can comprise any number of reciprocating pistons.

The combustion engines may comprise lean burning engines or rich burning engines or both. Lean burning engines are operated with an excess of air in the combusted air-fuel-mixture compared to the stoichiometric ratio. Rich burning engines are operated at stoichiometric or near-stoichiometric ratio of fuel and air.

As already mentioned, combustion engines can be used to drive a generator for generating electrical energy. A combustion engine coupled to a generator in such a way is known as genset in the prior art. In case several combustion engines of the plurality of combustion engines are coupled to an electrical grid, these combustion engines can be coupled to the same electrical grid or different electrical grids.

The power output of the combustion engines can of course also be used to directly drive mechanical loads, like for example pumps.

The plurality of combustion engines and/or the at least one further combustion engine can also comprise a different type of combustion engines, like for example gas turbines.

The plurality of combustion engines can comprise different types of combustion engines, e. g., combustion engines in the form of reciprocating engines and combustion engines in the form of gas turbines.

All features mentioned and/or claimed in connection with the system can also be used together with the computer system, the method, or the computer program product as claimed.

BRIEF DESCRIPTION OF THE DRAWINGS

Further advantages and embodiments are apparent from the accompanying figures and accompanying description thereof. The figures show:

FIGS. 2a and 2b illustrate an example geographical disposition of combustion engines without and with a grid overlay, respectively, FIG. 2c illustrates an example of a data grid representing the geographical data and the engine operation parameters of the combustion engines, FIG. 3 illustrates a schematic diagram of a neural network for calculating the prediction according to the invention, FIG. 6 illustrates a deconvolution operation.

DETAILED DESCRIPTION

Figure 1A:
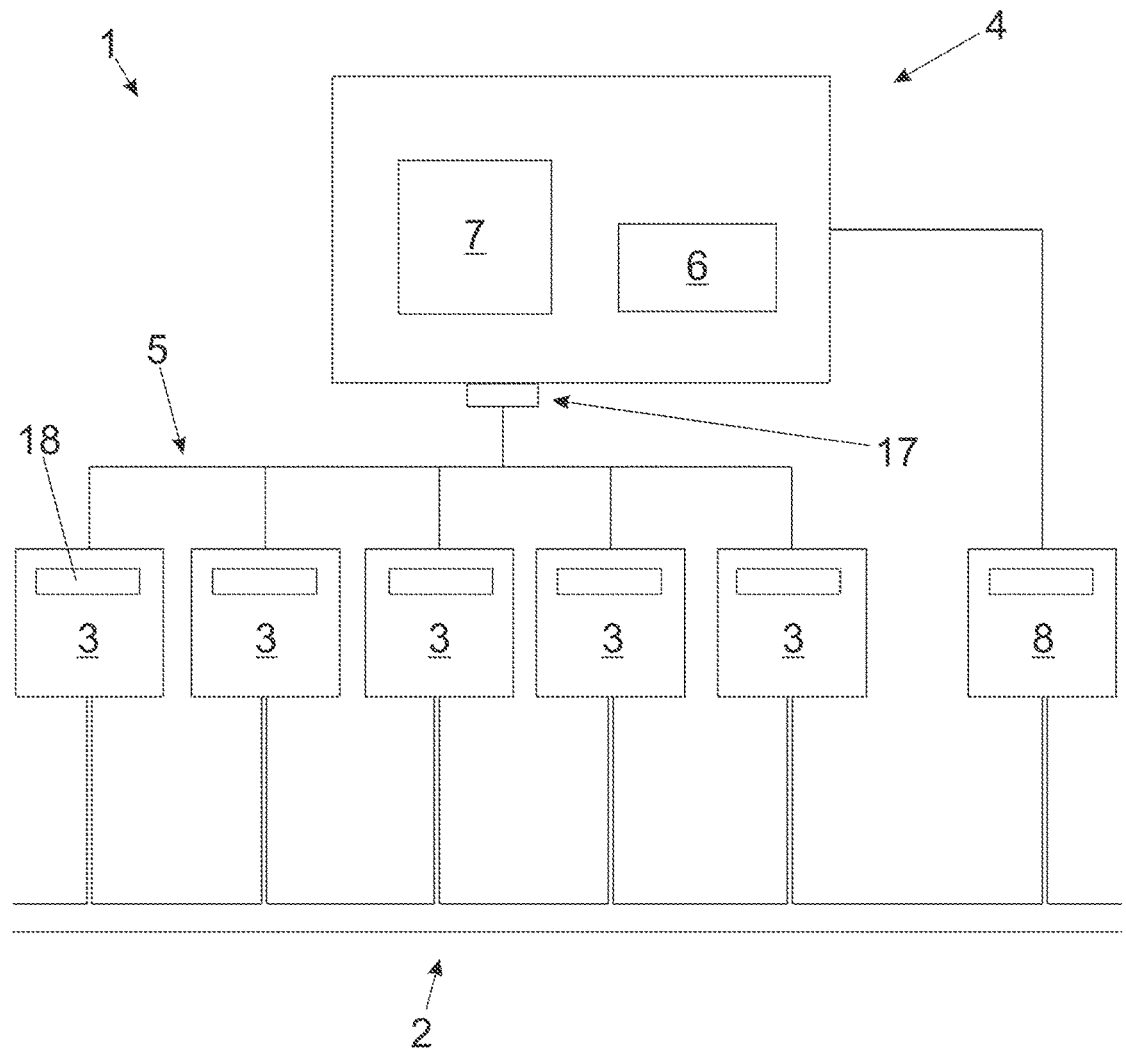
FIG. 1a illustrates a system according to the invention.

FIG. 1a schematically shows a system 1 according to the invention. It comprises a distribution grid 2 for gaseous fuel, such as natural gas (which comprises methane as a main part), biogas, propane and/or molecular hydrogen.

The grid provides this gaseous fuel for combustion engines 3 which are geographically located in a service area 21 of the distribution grid 2. An example of the geographical disposition of the combustion engines is given in FIGS. 2a and 2b. FIG. 1a does not reflect this geographical disposition, as its purpose is to depict the schematic functional relations within the system 1 according to the invention.

The combustion engines 3 are connected to a computer system 4 via data connections 5. Through the data connections 5 the combustion engines 3 provide engine operation parameters from an operation of the combustion engines to the computer system 4.

The combustion engines 3 may comprise control units 18 for open and/or closed loop control of the engines. These may be used to provide the operation parameters which are sent to the computer system 4.

In order to ensure a clear view of the structure of the system 1, the reference numerals for the control units 18 and the data connections 5 have only been provided once each in the depiction of FIG. 1a.

The computer system 4 comprises a signal input device 17 for receiving the operation parameters from the combustion engines 3 via the data connections 5.

The computer system 4 comprises furthermore a data storage device 6 in which the geographical data about the combustion engines 3 is stored. The geographical data may be stored permanently in the data storage device 6 or it may be stored transiently, in which case the geographical data may be provided together with the engine operation parameters via the data connections 5.

The computer system 4 comprises furthermore a processor 7 which is configured (e.g., through appropriate software) to calculate a prediction of at least one parameter characteristic for the gaseous fuel based on the engine operation parameters and the geographical data. An example for calculating the prediction is given in connection with FIGS. 2a to 2c and 3.

The prediction can for example be used to determine a well-suited location for deploying an additional combustion engine 3 or to determine a quality of the gaseous fuel at the geographic location of a further combustion engine 8, which is also supplied by the distribution grid 2 for gaseous fuel.

In the latter case, the prediction can be used to determine or correct set points for open or closed loop control (using the control unit 18) for an operation of the further combustion engine 8.

The prediction can also be used to determine when an operation of the further combustion engine 8 can advantageously be started or stopped, if no full-time operation of the further combustion engine is intended.

As has already been mentioned, the role of the further combustion engine 8 can be changed depending on what prediction according to the invention is desired and depending on its intended use. For example, if the further combustion engine 8 is started (maybe even because of a prediction of good fuel quality at a certain time), it may then be used as part of the combustion engines 3 the operation parameters of which are used as basis for the prediction according to the invention.

Additionally, expenses for the fuel and/or $CO_2$ emissions can be reduced because the properties of the fuel can be predicted at any outlet port of the distribution grid 2. The fuel for a specific combustion engine or other consumers can then for example be optimised at the given location for the desired application for example through admixture of other gaseous fuels (e.g., from renewable sources), like molecular hydrogen.

Figure 1B:
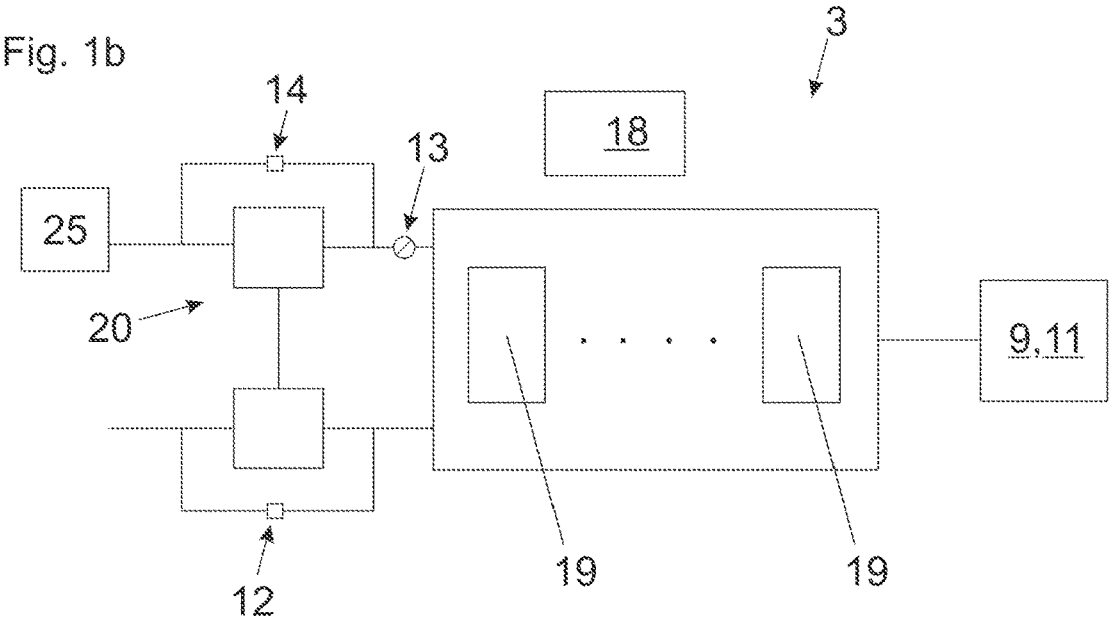
FIG. 1b illustrates a schematic diagram of a combustion engine.

FIG. 1b schematically depicts a combustion engine 3. It comprises combustion chambers 19, which may be in the form of piston cylinder units. The combustion engine 3 may, of course also be turbine or a heating plant or may comprise combinations thereof.

The combustion engine may comprise any number of combustion chambers 19.

The combustion engine 3 of FIG. 1b comprises furthermore a turbo charger 20 which includes an exhaust turbine and a compressor which is mechanically and/or electrically coupled to the turbine. Using the energy provided by the turbine the compressor provides charge air which is charged into the combustion chambers 19—together with the gaseous fuel or separate.

For controlling the combustion engine 3 at least one of the following can be provided: a throttle valve 13, a compressor bypass valve 14, wastegate 12, fuel valve 25. Additionally or alternatively, further control measures can be taken with regards to ignition timing for example.

Other actuators or different actuators may be present depending on the particular combustion engine 3, e.g., for determining emissions (like for example an NOx-Sensor).

As mentioned, the control of the combustion engine 3 can be realised with a control unit 18. The control unit is of course connected in an appropriate way to the different elements of the combustion engine 3 which are controlled. These connections have been omitted in the schematic drawing of FIG. 1b in order to keep a clearly viewable depiction.

The combustion engine 3 usually drives a load 9, which can for example be a generator 11 for generating electrical energy which can then be supplied to an electrical supply grid. The generated electrical energy can also be used to drive an electrical load directly.

Of course, the mechanical power provided by the combustion engine 3 can also be used directly to drive a mechanical load.

The combustion engine may for example be a gas engine, a dual fuel engine, or a gas turbine.

The arrangement of a gas engine driving a generator for generating electric energy is called a genset.

As already mentioned, FIGS. 2a and 2b depict a (fictional) example of the geographical disposition of the combustion engines within a service area 21 in which the distribution grid 2 supplies the gaseous fuel. Each of the crosses represents a combustion engine 3.

In FIG. 2b, there is a rectangular grid overlay covering the service are 21 of the distribution grid 2. The geographical data of the combustion engines 3 may be stored in the data storage device 6 in accurate manner such as in FIG. 1a or in a collected manner where only the presence of the combustion engine 3 in the respective tiles of the grid is stored.

The geographical data and the engine operation parameters can be provided in the form of a data grid 15, which is shown in FIG. 2c. The individual entries $Q_{i,j}$ are indexed by the position in the i-th row and j-th column within the data grid 15.

The values of the entries $Q_{i,j}$ in the data grid 15 are at least one operation parameter for each of the combustion engines 3, or estimations of the at least one characteristic parameter for the gaseous fuel, or estimations of changes of the at least one characteristic parameter of the gaseous fuel.

The placement of the entries $Q_{i,j}$ within the data grid 15 encodes the geographical data of the combustion engines 3. That is, an entry $Q_{i,j}$ in a specific position within the data grid 15 corresponds to one or more of the combustion engines situated in the corresponding tile in the grid of FIG. 2b.

The entries $Q_{i,j}$ for grid tiles where no combustion engine 3 or no engine operation parameter is available can be set to 0 or to some other string or value indicating this fact.

There can be several operation parameters for each combustion engine 3. In the data grid 15 this can be realised as two or more channels of the data grid 15. These channels can for example be realised as copies of the grid depicted in FIG. 2c for each of the channels, such that the whole data grid 15 then has an additional index k for the different channels. The entries in the data grid can then be denoted by $Q_{ij}^{(k)}$.

Additional channels in the data grid can also be used if there are more than one combustion engines 3 in one of the tiles of the grid overlay of FIG. 2b. Alternatively or additionally, the entries $Q_{i,j}$ can be averages or median values of the operation parameters of the single combustion engines 3 in each tile.

The values for the entries $Q_{i,j}$ can be estimations for the at least one characteristic parameter which can for example be calculated according to the following example (for a gas engine):

Input Variables:
Gas Pressure (P, bar)
Gas Temperature (T, ° C.)
Gas Volume (V, m³)
Load (L, kWh) (can be measured as electrical power output in case of a genset or as mechanical power output)
Output Variable:
Gas Quality (Gross Calorific Value, kWh/Nm³)
Calculation:

$$\text{Efficiency } \eta = f(L)$$

$$\text{Normal Volume (NV)} = \frac{P \times 273.15}{(273.15 + T) \times 1.01325} \text{ V} (\text{Nm}^3)$$

$$\text{Gross Calorific Value } Q = \frac{L}{\eta \times NV} \text{ (kWh/Nm}^3)$$

Other ways for estimating the at least one characteristic parameter of the gaseous fuel can of course also be used. This concerns both different ways of estimating the Gross Calorific Value (depending e.g., on the specific combustion engine) and other characteristic parameters of the gaseous fuel, like a methane number or the like. Estimations for the methane number in and of themselves are known in the prior art.

The data grid 15 can be provided as or for an input layer IL of a neural network 16 for calculating the prediction according to the invention. General information and information on examples of how such a neural network 16 can be set up can be found under the respective sections above in the general part of the description.

An advantageous embodiment for an architecture of a neural net 16 is depicted in FIG. 3.

It is noteworthy that the data grid 15 does not have to be provided to the neural net 16 in the exact form depicted in FIG. 2c. It is for example common to provide the data grid 15 in vectorised form to convolutional layers CL1, CL2 of the network on the level of the software employed to set up the neural network.

The actual data structures provided for the processor 7 (i.e., after compiling) can, of course, differ significantly and is in many cases specially adapted to the hardware (including the processor 7) used.

The different layers of the neural network 16 are successively computed from the input layer IL in the upper left to the output layer OL in the lower right. These (hidden) layers are in order: a first convolution layer CL1 (one of the at least one first layers in this embodiment), a first pooling layer PL1 (max-pooling), a second convolution layer CL2 (one the at least one first layers in this embodiment), a second pooling layer PL2 (max-pooling), a first deconvolution layer DL1 (one the at least one second layers in this embodiment), and a second deconvolution layer DL2 (one the at least one second layers in this embodiment).

Figure 4:
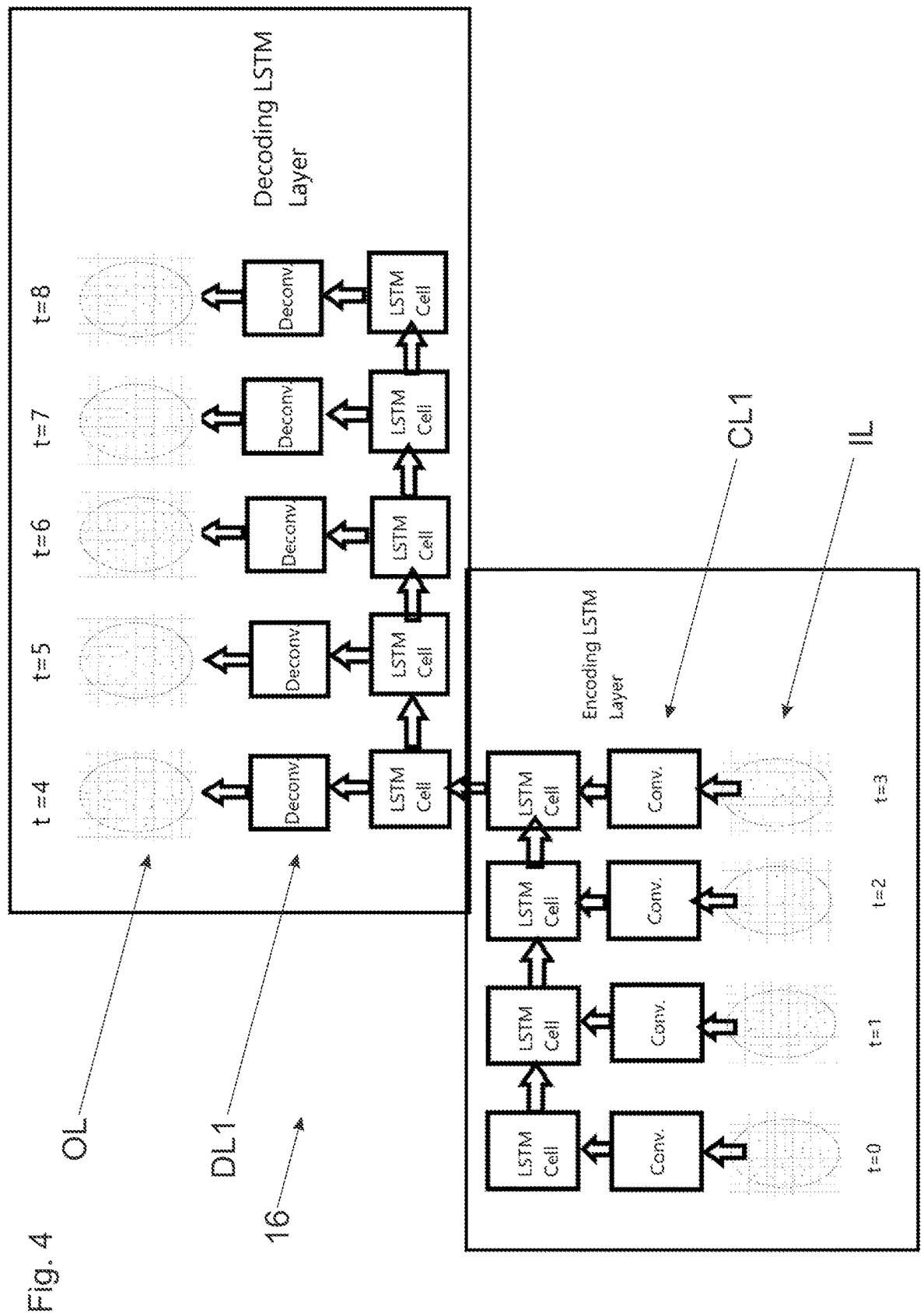
FIG. 4 illustrates a schematic diagram of a further embodiment of the invention making use of LSTM cells.

FIG. 4 shows another embodiment of a neural network according to the invention. LSTM cells are used as at least one third layer at each time step for "evolving" the fuel properties to the next time step. Convolutional layers CL1 and deconvolutional layers DL1 are used at each time step for "encoding" and "decoding" these properties—or their spatial distributions—much in the same way as in the embodiment according to FIG. 3. Note that the input and output layers IL and OL are in this example given as data grids 15 (symbolised as little versions of FIG. 2b). General ways of implementing LSTM cells have been described above.

Figure 5A:
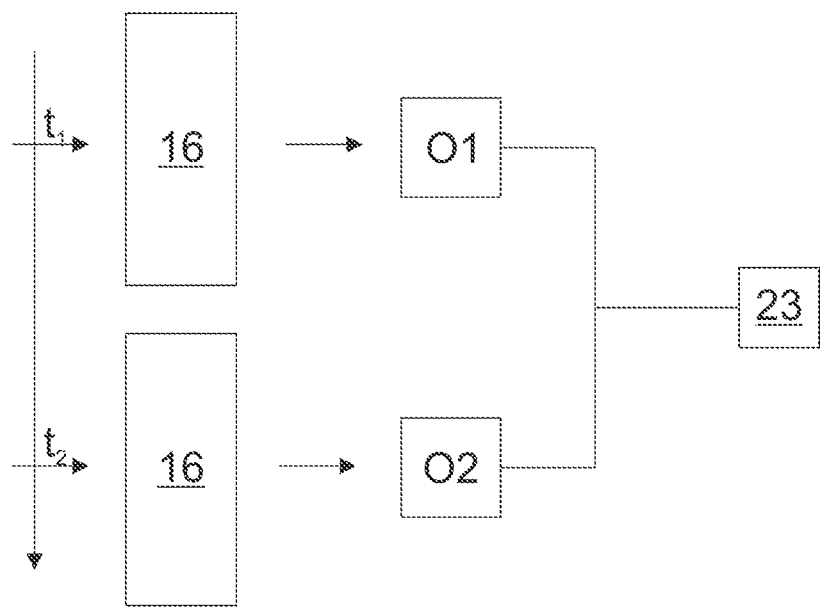
FIGS. 5a and 5b illustrate two schematic diagrams regarding a further embodiment of the invention.

FIG. 5a shows a simple embodiment of the invention where only a convolutional neural network is used at different times $t_1$ and $t_2$. The convolutional neural network according to FIG. 5 includes at least one fully connected layer (not shown) in order to determine given features of the distribution of the gaseous fuel in the distribution grid at or near the geographical location of interest (i.e., in the vicinity 22) in a manner which is in principle known in the prior art.

At each time $t_1$ and $t_2$ this results in time specific outputs O1 and O2 of the convolutional neural network 16 which represent these features. Of course it is also possible to use more than two times $t_1$ and $t_2$ (i.e., $t_i$ with i indexing the number of time steps used). The times $t_i$ represent the first time (of which there is then more than one in this embodiment) or the first time period according to the invention.

Figure 5B:
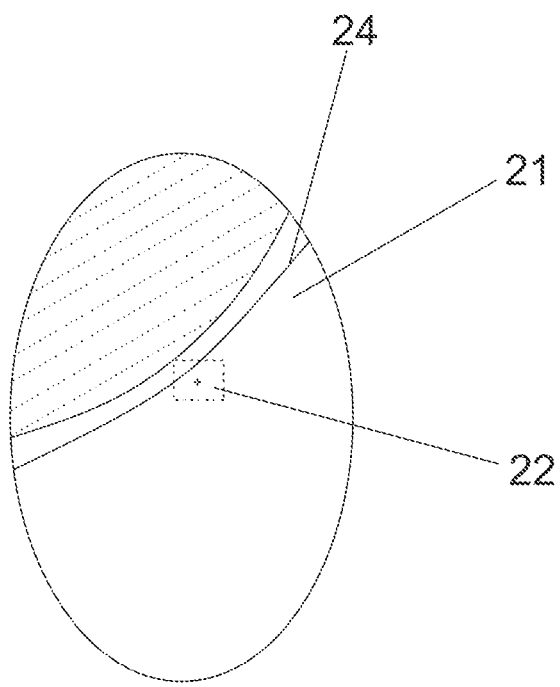

The output of the convolutional neural network at times $t_1$ and $t_2$ according to FIG. 5a could be visualised as depicted in FIG. 5b. The actual output of the convolutional network will of course not be in the form of a picture as in FIG. 5b. FIG. 5b is only drawn in this way as a simple example in order to make it clear for the reader how this embodiment of the invention works.

As can be seen there is an area (hatched) of different gas quality (at least one characteristic parameter of the gaseous fuel) compared to the rest of the service are 21 of the distribution grid 2. If the hatched area increases in size so that its new boundary 24 overlaps the vicinity 22 of geographical location of interest (visualised as a cross), this can be used as an indicator that the gas quality at the geographical location is about to change.

Computationally, in the embodiment of FIGS. 5a and 5b the outputs for times $t_1$ and $t_2$ are compared (subtracted from each other in a suitable way) and if the difference is above a given threshold value an alarm is triggered. The prediction according to the invention is then simply that at the location of interest there will be a change in the value of the at least one characteristic parameter of the gaseous fuel in the next time step (i.e., at the second time or during the second time period according to the invention). This is visualised as computation block 23.

FIG. 6 depicts a deconvolution operation ($\oplus$) as superposition of the filter $F_k^{(j)}$ with factors from the input matrix $h^{(j-1)}$. As has been mentioned in the earlier section "Deconvolution Operations" this deconvolution operation can be implemented as a matrix operation with the transposed sparse matrix. Note, that the vector for $\vec{h}^{(j-1)}$ is the vectorised form of the input matrix $h^{(j-1)}$ of FIG. 6.

The invention claimed is:

1. A system, comprising:
a distribution grid for a fuel,
combustion engines, which are coupled with the distribution grid and are configured to combust the fuel, and
a computer system comprising data connections to the combustion engines and a data storage device, wherein the computer system is configured to receive engine operation parameters stemming from an operation of the combustion engines at a first time and/or during a first time period via the data connections and geographical data of the combustion engines are stored in the data storage device,
wherein the computer system has a processor configured to compute a prediction for at least one characteristic parameter of the fuel at a second time and/or during a second time period later than the first time and/or the first time period and with respect to a geographical location, and
the computation of the prediction being based on the geographical data and the engine operation parameters of the combustion engines.

2. The system according to claim 1, wherein the prediction being based on the engine operation parameters is based on changes of the engine operation parameters at the first time or during the first time period.

3. The system according to claim 1, wherein the at least one characteristic parameter of the fuel comprises:
a first parameter indicative of the combustion energy of the fuel, wherein the first parameter comprises a gross calorific value of the fuel, or
a second parameter indicative of a tendency for uncontrolled combustion of the fuel, wherein the second parameter comprises a methane number.

4. The system according to claim 1, comprising at least one further combustion engine coupled to the distribution grid and configured to combust the fuel.

5. The system according to claim 4, wherein set points for a closed and/or open loop control of the at least one further combustion engine and/or a time of operation of the further combustion engine are based on the prediction of the at least one characteristic parameter of the fuel for the second time and/or the second time period with respect to the geographical location of the at least one further combustion engine.

6. The system according to claim 1, wherein the engine operation parameters comprise at least one of: mechanical power output of the combustion engine and/or a load of the combustion engine, thermal output of the combustion engine and/or a load of the combustion engine, electric power output of a genset comprising the combustion engine and a generator driven by the combustion engine, charge pressure, charge temperature, efficiency of a genset comprising the combustion engine and a generator driven by the combustion engine, volume of the fuel, pressure of the fuel, temperature of the fuel, ignition timing point, wastegate position, throttle valve position, compressor bypass valve position, variable valve timing parameters, variable turbo charger geometry position, emission parameters of the combustion engine and/or changes over time of these quantities.

7. The system according to claim 1, wherein the processor is configured to convert the engine operation parameters to estimations of the at least one characteristic parameter of the fuel and/or to estimations of changes of the at least one characteristic parameter of the fuel.

8. The system according to claim 7, wherein
the engine operation parameters and/or the estimations of the at least one characteristic parameter of the fuel and/or the estimations of the changes of the at least one characteristic parameter of the fuel on the one hand and the geographical data of the combustion engines on the other hand are provided in the form of a data grid, wherein positions of entries ($Q_{ij}$) within the data grid represent the geographical data and values of the entries ($Q_{ij}$) represent the engine operation parameters and/or the estimations of the at least one characteristic parameter and/or the estimations of changes of the at least one characteristic parameter, and
the data grid is provided for and/or as an input layer (IL) of a neural network.

9. The system according to claim 8, wherein the engine operation parameters and/or the estimations of the at least one characteristic parameter and/or the estimations of changes of the at least one characteristic parameter and/or data from chemical analysis of the fuel are provided in two or more channels of the data grid.

10. The system according to claim 9, wherein the processor is configured to calculate the prediction using a machine learning model having at least one neural network.

11. The system according to claim 10, wherein the processor is configured to receive and/or represent the data grid as the input layer (IL) of the at least one neural network, and the at least one neural network comprises a convolutional neural network.

12. The system according to claim 11, wherein the convolutional neural network contains at least one first layer (CL1, CL2) comprising convolution operations with filters of smaller size than the data grid, where a number of channels of the filters equals a number of the channels of the data grid.

13. The system according to claim 12, wherein the at least one neural network contains at least one second layer (DL1, DL2) comprising deconvolution operations and weights for the at least one second layer, which weights are learned during training of the at least one neural network such that an output of the at least one neural network is the prediction of the at least one characteristic parameter of the fuel at the second time or during the second time period and with respect to the geographical location.

14. The system according to claim 13, wherein the at least one neural network contains at least one third layer realising an LSTM network with weights, which are learned during training of the at least one neural network such that an output of the at least one neural network is the prediction of the at least one characteristic parameter of the fuel at the second time or during the second time period and with respect to the geographical location.

15. A computer system for predicting at least one characteristic parameter of a fuel supplied by a distribution grid, comprising:
a signal input device configured to receive engine operation parameters stemming from an operation of combustion engines at a first time and/or during a first time period,
a data storage device configured to store geographical data of the combustion engines, and
a processor configured to compute a prediction for the at least one characteristic parameter of the fuel at a second time and/or during a second time period later than the first time and/or the first time period and with respect to a geographical location, the prediction being based on the operation parameters and the geographical data of the combustion engines.

16. A computer program product for predicting at least one characteristic parameter of a fuel supplied by a distribution grid comprising instructions which cause a computer executing the computer program product to:
receive operation parameters of combustion engines stemming from an operation of the combustion engines with a fuel from a distribution grid at a first time and/or during a first time period,
access a data storage device to obtain geographical data of the combustion engines, and
compute a prediction for the at least one characteristic parameter of the fuel at a second time and/or during a second time period later than the first time and/or the first time period and with respect to a geographical location, the prediction being based on the operation parameters and the geographical data of the combustion engines.

17. The computer program product according to claim 16, wherein the computer program product is configured to use at least one neural network, wherein the computer program product is configured to use training data to obtain a learned parameter set and compute the prediction for at least one characteristic parameter of the fuel.

18. The computer program product according to claim 17, wherein the at least one neural network comprises a convolutional neural network and/or a recurrent neural network.

19. The computer system according to claim 15, wherein the processor is configured to computer the prediction using a machine learning model having at least one neural network, wherein the at least one neural network comprises a convolutional neural network and/or a recurrent neural network.

20. The system according to claim 1, wherein the processor is configured to calculate the prediction using a machine learning model having at least one neural network, wherein the at least one neural network comprises a convolutional neural network and/or a recurrent neural network.

* * * * *